No. 756,356. PATENTED APR. 5, 1904.
C. D. GUNN.
MEAT TENDERER.
APPLICATION FILED JUNE 5, 1903.
NO MODEL.

WITNESSES.
D. E. Carlsen
E. C. Carlsen

INVENTOR.
Charles D. Gunn.
BY his ATTORNEY.
A. M. Carlsen.

No. 756,356.

Patented April 5, 1904.

UNITED STATES PATENT OFFICE.

CHARLES D. GUNN, OF AMERY, WISCONSIN, ASSIGNOR OF ONE-HALF TO LOUIS SODERBERG, OF FREDRIC, WISCONSIN.

MEAT-TENDERER.

SPECIFICATION forming part of Letters Patent No. 756,356, dated April 5, 1904.

Application filed June 5, 1903. Serial No. 160,216. (No model.)

*To all whom it may concern:*

Be it known that I, CHARLES D. GUNN, a citizen of the United States, residing at Amery, in the county of Polk and State of Wisconsin, have invented certain new and useful Improvements in Meat-Tenderers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in meat-tenderers, and has for its general object the providing of a meat-tendering device with the several advantages hereinafter described, pointed out in the claim, and illustrated in the accompanying drawings, in which—

Figure 1:
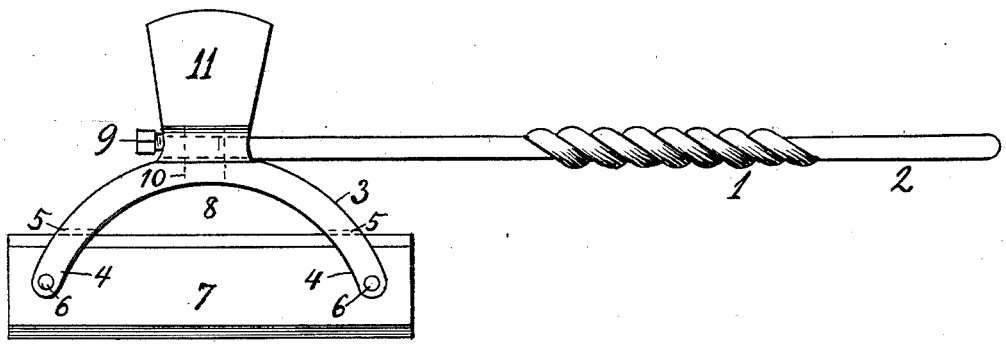
Figure 2:
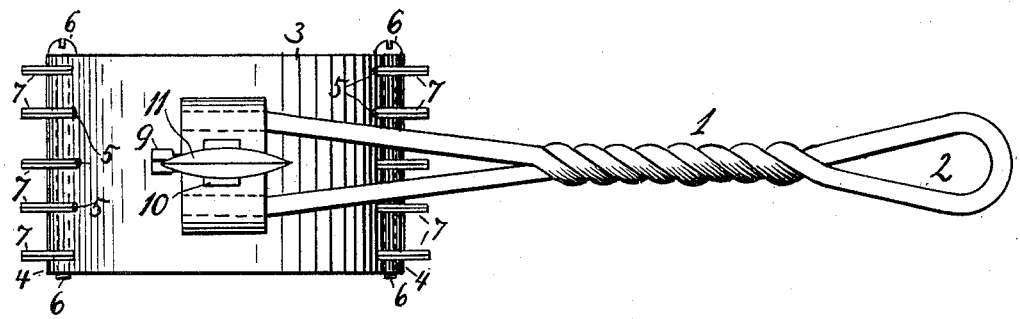
Figure 3:
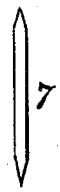

Figure 1 is a side view of my improved meat-tenderer. Fig. 2 is a top view of Fig. 1, and Fig. 3 is an end view of one of the blades operating on the meat.

Referring to the drawings by reference-numerals, 1 designates the handle by which the device is operated. It preferably consists of a piece of heavy wire doubled upon itself and twisted together except the loop 2, which gives a firm hold of the handle when in use and may be placed on a nail or peg, so as to suspend the tool when not in use. Upon the bifurcated front end of the handle is secured a bow-shaped head 3, in whose forward and rearward ends 4 are inserted in slits 5 and secured by the screws 6 a series of double-edged blades 7 with an intervening space 8 between the head and the middle portion of the blades. In the top of the head is secured by a set-screw 9 the shank 10 of an ax or pick 11, which may be used as an ice-pick, but is especially intended for cutting out bones or extra hard lumps or sinews of the meat, while the front edges of the blades are used in the regular tendering process of the beefsteak or other meat to be tendered preparatory to broiling. When the blades 7 get dull at one edge, the screws 6 are removed, the blades reversed, with their opposite edges to the front, and the screws inserted again and screwed tight. The open spaces between and above the blades give access to the atmospheric pressure upon the upper side of the slice of meat operated on and helps to free it from the blades every time the tool is raised.

Another advantage with this device is that its series of straight-edged blades actually cut so many slits into the meat for each blow given, and by turning the meat, so that the blades cut across the slits first made, the meat is practically masticated, while in the use of the common meat-tenderers the meat is simply hammered by a toothed hammer, which leaves most of the stringy parts of the meat unsevered, which is found very unpleasant in eating the meat.

Having thus described my invention and even alluded to the fact that there exist meat-tenderers with a hammer-face having more or less sharp teeth, what I claim as new, and desire to secure by Letters Patent, is—

As an improved article of manufacture, a meat-tenderer comprising, in combination, a substantially straight handle, a segmentally-curved heavy plate secured at its middle to the front end of the handle to serve as a head-piece, a series of parallel blades secured in slits in the downward-curved edges of the plate or head-piece, so as to obviate suction between the plate and the meat operated on.

In testimony whereof I affix my signature in presence of two witnesses.

CHARLES D. GUNN.

Witnesses:
 GEO. HEALD,
 EDW. VINCENT.